United States Patent
Randolph et al.

[11] 3,718,798
[45] Feb. 27, 1973

[54] TRAVELING WELDING APPARATUS

[75] Inventors: James B. Randolph, Columbus, Ohio; Jerome W. Nelson; Joe R. Paysinger, both of Houston; E. Eugene Crump, Richmond, all of Tex. 77018

[73] Assignee: CRC-Crose International, Inc., Houston, Tex.

[22] Filed: June 21, 1971

[21] Appl. No.: 155,320

Related U.S. Application Data

[63] Continuation of Ser. No. 830,369, June 4, 1969, abandoned.

[52] U.S. Cl. ..........................219/60 A, 219/125 R
[51] Int. Cl. .................................................B23k 9/02
[58] Field of Search...219/125 R, 124, 6, 60 A, 60 R, 219/76, 130, 137; 228/45

[56] References Cited

UNITED STATES PATENTS

| | | | |
|---|---|---|---|
| 3,555,239 | 1/1971 | Kerth | 219/125 R |
| 3,035,156 | 5/1962 | Staley | 219/125 R |
| 3,268,707 | 8/1966 | Thomas | 219/125 R |
| 2,013,630 | 9/1935 | Goldsborough | 219/60 |
| 3,551,636 | 12/1970 | Nelson | 219/125 R |

*Primary Examiner*—C. L. Albritton
*Assistant Examiner*—L. A. Schutzman
*Attorney*—Edwin M. Thomas

[57] ABSTRACT

A welding apparatus adapted to travel along a predetermined path, form a weld along such path, includes a welding head, means for mounting the head on a traveling carriage, means for supplying electrode material to said head, and means for continuously and/or occasionally changing the alignment and/or angular position of the head with respect to the work being welded in order to apply molten electrode material in a variable pattern and/or at variable angles of projection.

10 Claims, 13 Drawing Figures

INVENTORS
Jerome W. Nelson
Joseph R. Paysinger
Eugene E. Crump
James B. Randolph

PATENTED FEB 27 1973

INVENTORS
Jerome W. Nelson
Joseph R. Paysinger
Eugene E. Crump
James B. Randolph

TRAVELING WELDING APPARATUS

The present application is a continued of application Ser. No. 830,369, filed June 4, 1969, now abandoned.

BACKGROUND AND PRIOR ART

For forming annular or girth joint welds, as between lengths of pipe or other annular bodies, it has been proposed to clamp together internally the members to be welded, and form by automatic means an internal weld between the adjoining ends. For welding large diameter pipe lines and analogous structure, an apparatus suitable for this purpose has been described in U.S. application Ser. No. 608,872 by Nelson and Sims, filed Jan. 12, 1967, now U.S. Pat. No. 3,461,264. While such an apparatus sometimes can, under favorable conditions form a complete weld, e.g., with thin-walled pipes, tubing, etc., as a general rule, supplementary welding operations must be performed from the outside to complete the job. Numerous suggestions have been made in the past for apparatus and methods that might be used externally to make a weld between the adjoining ends of pipes, tubes, etc. Some have proposed cutting a narrow kerf between closely adjoining pipe ends and filling such kerf with welding material at a single pass, as in U.S. Pat. No. 3,084,246. With many, perhaps most pipe lines, single pass welding so far has not proved to be satisfactory. It has also been proposed to form welds between pipe ends and analogous work pieces by multiple pass operations but prior art proposals to do so automatically have not generally been successful. Difficulties have been encountered, such as "burn-throughs", irregular deposits of weld metal producing flaws, and the like. One object of the present invention is to avoid such difficulties.

It has also been proposed further to use a carriage traveling on a guide track and supporting a welding head which thus is carried around and forms a weld along the pipe juncture. Proposals have been made for oscillating the welder head to deposit weld metal along a sinuous path, etc. The present invention employs some of such features in a novel manner to obtain improved results.

There has been a tendency in recent years to use thicker walled pipes for transmitting gas, oil and other petroleum products for long distances and under relatively high pressures. These thick-walled pipes have been difficult to weld with the strength and soundness of joint necessary to withstand high pressures, without leakage or rupture. Most if not all the commercial welds in large diameter pipe lines have been made manually and at considerable expense because automatic equipment or even semi-automatic equipment for doing the job satisfactorily has not been available. An important object of this invention is to design automatic welding equipment that will produce satisfactory girth welds, externally, in large diameter, thick-walled pipes and similar structures. It can be used for multiple pass operations along narrow deep joints or for wider gapped joints. The apparatus of this invention is adaptable for producing multiple and varying welding passes, including projection of a weld or welding material at different angles into a deep, narrow groove or kerf between adjoining members, producing various weld patterns of sinusoidal pattern to fill wider grooves, and producing cap passes which may be of sinusoidal or other patterns, as desired.

While the invention is designed particularly for forming welds by traveling around an annular work piece, it can be used for welding along straight or curved lines to join other work pieces together.

SUMMARY

A versatile welding unit, capable of projecting weld metal from an electric arc to varying depths and from various angular positions with respect to the work is made up of an angularly adjustable welding head, means for controlling the angularity of position of the head, including means for continuously varying or oscillating the head for making variable sinusoidal depositions of weld metal along a predetermined path, variably controllable electrode supply and feeding means, all adapted to be supported on a traveling carriage adapted to be guided along a predetermined path. Means are included for changing at will the angle of the welding head and its electrode projection, for selectively oscillating in the head through a narrow angle or a wider one, or not at all, to govern both the direction and the path of electrode deposition with respect to the work. The unit is readily attachable to and detachable from a traveling carriage adapted to ride on and be guided by a flexible track member which in turn can be adjustably mounted on and supported by a work piece.

DESCRIPTION OF PREFERRED EMBODIMENT

Figure 1:
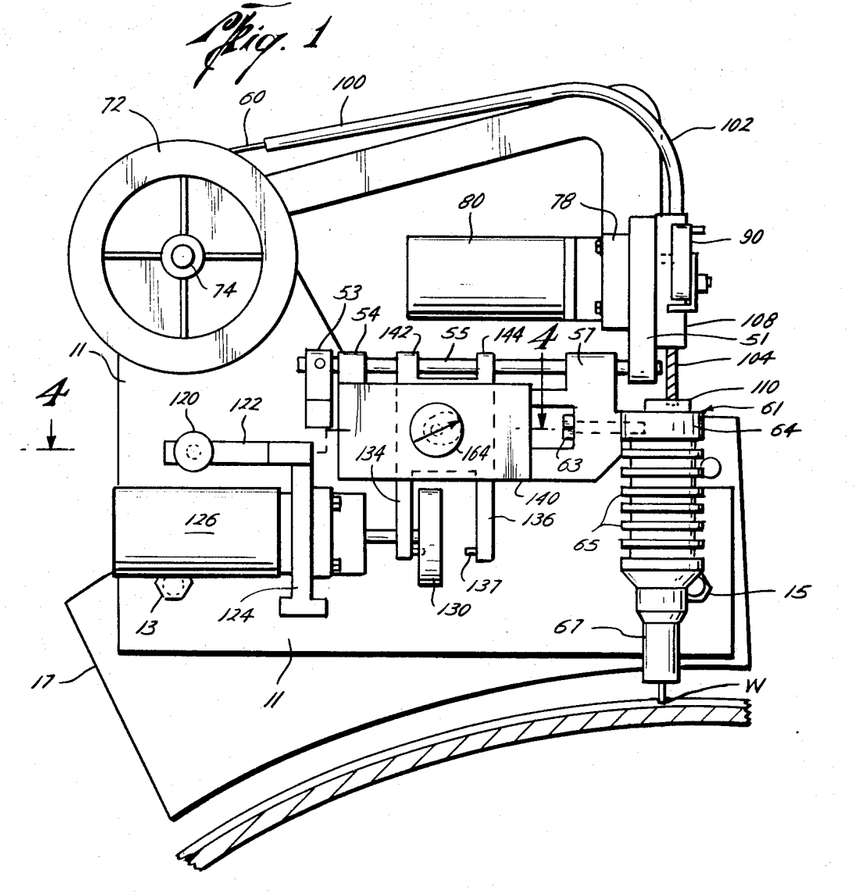
FIG. 1 is an elevational side view of a preferred form of welder unit made according to the present invention.

Referring first to FIG. 1, the welding unit comprises a main frame member in form of a flat plate 11 made of aluminum or other light metal of sufficient thickness and strength to support all the parts rigidly. This plate is adapted to be secured by means of bolts 13 and 15 to the side flange 17 of a traveling carriage unit. The carriage unit is shown in outline in FIG. 3 and consists of a base member 21 provided with grooved rollers 23, 25, which engage the respective edges of a flexible guide track member 27 supported on the surface of the pipe line or other annular work piece 29. At the left in FIG. 3 the adjoining work piece 31 is shown and an additional flexible track or band member 33, which may be like band 27 or different. The band members 27 and 33 are each adapted to support one or more traveling carriages on either side of the juncture line 35 where the weld is to be made. It will be understood that the welding units and the carriages which support them may be made to face either right or left and to travel in either direction.

Figure 3:
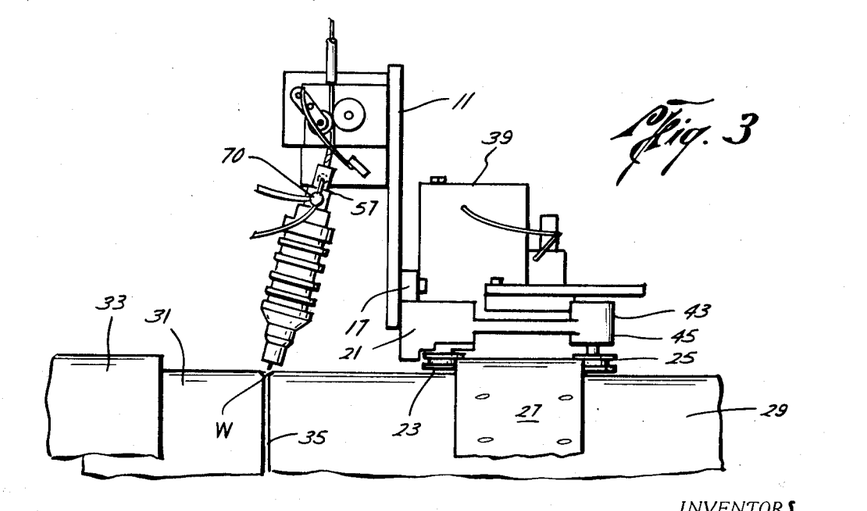
FIG. 3 is a perspective view on smaller scale, showing use of the unit of FIGS. 1 and 2 to form an external weld pass between adjoining ends of two large diameter pieces of pipe or analogous annular members.

On the carriage base member 21 is mounted an electronic control box 39 with appropriate controls for the mechanism which drives the carriage. The latter is driven along the track by one or more power-driven grooved rollers, such as 25, operated by electric motor 43. The motor is mounted in an enlarged boss support 45 on the base member 21. The carriage and the track means per se form no part of the present invention.

As previously noted, the plate 11, which comprises the main frame member of the welding unit, is secured to a side flange 17 of the carriage base member 21.

A pair of brackets 51 and 53 attached to the plate 11 in any suitable manner, support a rock shaft 55 on which is pivotally mounted bracket 57 of insulating material such as a reinforced plastic. A welding head 61 is secured to bracket 57 by a bolt 63. The welding head is of more or less conventional construction, having a metal body 64 formed with a series of heat dissipating ribs 65 formed thereon, and enclosing partially a ceramic head or contact tube 67, which surrounds the electrode wire W. Appropriate connections 70 are provided, see FIG. 3, for supplying electric welding current and a shielding gas such as nitrogen, argon or the like, to the welding head. A reel 72, carrying a supply of welding wire W, is mounted on a stud 74 attached to the upper left corner of the frame, as seen in FIG. 1. The frame also mounts a wire electrode feeding mechanism consisting of a bracket 76 secured to the plate 11 to which is bolted a gear-reducing mechanism in a housing 78 and a drive motor 80. The drive motor drives a wire feed roller 82 through the gear reduction mechanism. A pressure roller 84 is mounted on a stud 86 secured to the lower end of a pivoted arm 90 which holds the wire W against the feed roller to assure positive feeding. The arm 90, pivoted at its middle on a pin 92, is urged to wire gripping position by a leaf spring 94, secured to a bracket 96, which is constrained to pass outside of the stud 86, which supports the gripping roller and inside of a stud 98 on the upper or outer end of the arm member 90. Thus, the leaf spring as it tends to straighten, applies a double gripping force to the roller 84. The wire W is guided to the drive rolls first through a flexible tube 100 which extends near the spool 72 and connects to a curved semi-flexible tube 102 secured to the drive mechanism, both tubes being of insulating material. As the wire emerges from the rollers it passes through a wire guide 104 in the form of a metal coiled spring or conduit. The latter is flexible but resilient. It tends to hold the head 67 in alignment with the tangential gripping plane of the wire to the feed rollers but the head can be deflected to the right or to the left. See the dotted outline in FIG. 2. Member 104 is held by its upper end in a recess in the bottom of the insulated block 108 which surrounds the feed rollers. The feed rollers also are insulated from the machine. The lower end of the wire guide member 104 fits snugly in a recess in the top of the metallic cap 110 which is integral with or otherwise fastened to the metal body 61 of the welding head. The wire spool 72 also is made of non-conductive material so that the whole electrode wire supply and the feeding mechanism therefor are electrically insulated from the main body of the machine and the work pieces 29, 31.

The machinery, of course, is in electrical grounded contact with the work pieces. As shown, these consist of a length 29 being joined end to end to a length 31 of pipe as already mentioned. However, adjoining plates may be welded edge to edge in the same manner.

Figure 2:
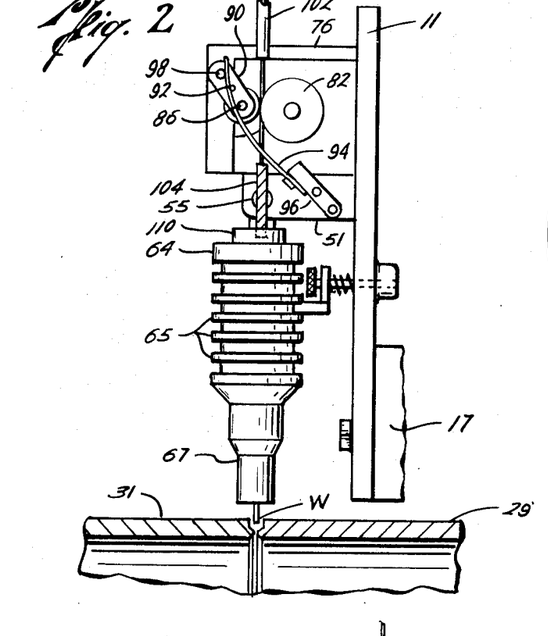
FIG. 2 is a front elevational view of the apparatus of FIG. 1.
Figure 4:
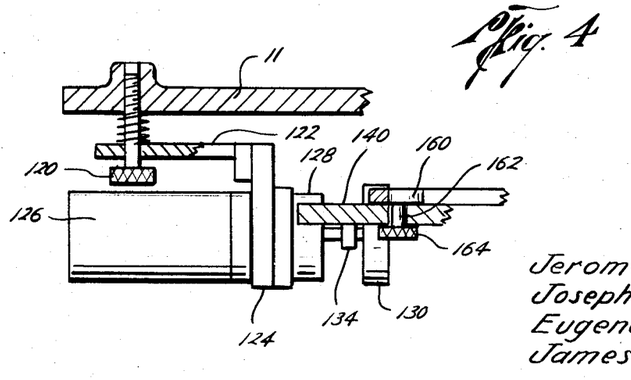
FIG. 4 is a fragmentary view, with some parts shown in section and other parts omitted of the apparatus of FIGS. 1 to 3, taken substantially along line 4—4 of FIG. 1.
Figure 5:
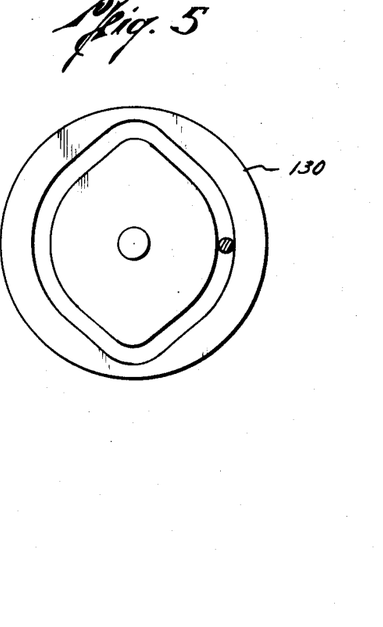
FIG. 5 is a face view of an oscillation control cam element, taken substantially along line 5—5 of FIG. 1.

The welding mechanism, consisting of the head and the lower end of the guide 104, may be moved angularly about the pivot shaft 55, as seen in FIG. 2. The purpose of this is twofold. It permits angular adjustment of the welding head as seen in FIG. 2, note the dotted line, either to obtain exact centering or alignment of the wire electrode with the gap 35 to be welded or to project the wire W at an angle with respect to vertical. It also provides for oscillation of the welding head, when this is desired. The adjustment for centering or for projection angle, just described, is obtained by means of an adjusting screw 120 which passes through an arm 122 attached to a bracket 124, which attaches to the welding head and also supports a drive motor 126 and a gear reducing mechanism 128. See FIG. 4. The purpose of this motor and drive mechanism is to rotate a cam 130 which has a face groove on either side, the contour and shape of the groove being typically illustrated in FIG. 5. One of these cam grooves is designed to rock the welding head through an arc appropriate for a narrow sinusoidal welding path, e.g., for filling a narrow gap, and the other rocks it through a wider path, e.g., for a weld capping pass. Obviously, if other paths are desired, the cam 130 may be changed or replaced by other cams to give the proper width of oscillation. With this arrangement, one or the other of two depending arms 134 and 136 engages one of the face cams by a follower 137. Rotation of the cam gives the desired amplitude of rocking to the bracket 57 which supports the welding head. The follower arms 134 and 136 are supported on a plate 140 which has upward extending ears 142 and 144, slidably mounted on the pivot rod 55. By means of an eccentric 160 secured to the shaft 162 of a rotatable knurled knob 164, see FIG. 4, the follower arms 134 or 136 may be engaged through their cam followers 137 with the groove in one or the other faces of the cam 130, to give the desired amplitude or pattern of rocking to the welding head support.

Thus, through adjustment of screw 120, the alignment of the welding wire with the joint may be accurately realized whereas by turning the shifter knob 164 to the "fill" or "cap" position, and thus engaging a follower with one face of the cam or the other, a narrow sinusoidal filler welding pass may be applied, or a wider filler pass, such as a cap or cover for the weld.

The apparatus can be adjusted, if desired, so that neither of the followers 137 engages cam 130. In this case there is no oscillation and the wire feeds directly into the groove between the pipe ends. This type of operation is desirable for filling molten electrode material straight into the bottom of the groove or kerf.

Figures 6, 7, 8:
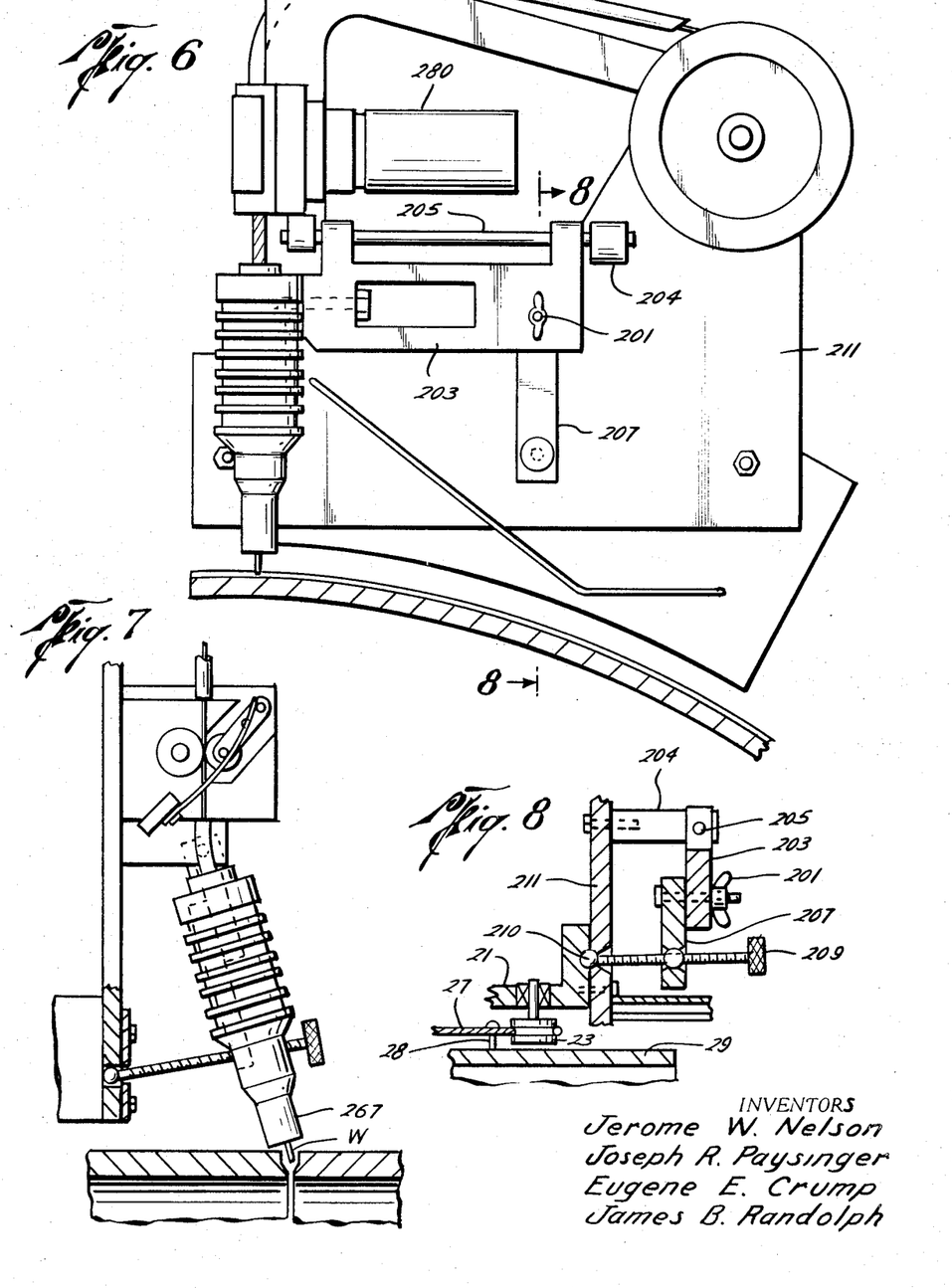
FIG. 6 is a side elevational view of a modified apparatus adapted particularly for applying a penetrating weld pass at an angle from the plane of the joint being formed.
FIG. 7 is a front view of the apparatus of FIG. 6.
FIG. 8 is a fragmentary sectional view, with certain parts omitted, of the apparatus of FIGS. 6 and 7.

Referring now to FIG. 6, the apparatus there shown is essentially similar to that of FIG. 1, except that it is left handed rather than right handed and the oscillating mechanism of FIGS. 1 to 5 is omitted. In filling a deep, narrow gap, as is necessary for welding together the ends of thick-walled pipes, it is frequently desirable to make a welding pass from a laterally-displaced position and at a substantial angle to the plane of the joint, followed by a similar pass from the other side at a reverse angle. Such procedure is needed in welding between thick, closely spaced members, to fill the groove up to a point where it can be completed by one or more sinusoidal or capping passes. In FIG. 3 the apparatus is shown in full lines as inclined at a considerable angle from the upper left and in dotted lines from the upper right. It can be used for the purposes just described. However, the apparatus shown in FIG. 6 has an additional advantage of simplicity and is better adapted for positive control over a wider angle. The flexible connector or "liner" 104 of FIG. 1 is sufficiently rigid that it serves pretty well by itself to line up the wire electrode parallel with the welding plane for vertical wire feed. A more accurate and positive positioning may be needed, particularly where the wire is to be fed at a substantial angle as in FIG. 3. The apparatus of FIG. 6 provides for wider variations in angle of feed and more positive control over such angle.

In this case, the side frame member or plate 211 is essentially of the same general form as member 11, already described. So also are the wire feed rolls, the roll mountings, and the wire guide mechanisms. These need not be described in detail.

Attached by means of a thumb screw 201 to the insulated and non-conductive welder supporting bracket 203 pivoted on rod 205, which is mounted on brackets 204 in the same general manner as rod 55 of the previous figure, is a depending arm 207. An adjustable thumb screw 209 is secured against longitudinal movement but freely rotatable in nut 210 in plate 211. The threads of screw 209 engage a threaded swivel in the arm 207, so that as the screw is turned to the right or the left, the welding head adjusts to the right or the left, with respect to the plane of the joint being welded.

By inclining the head at a substantial angle, as in FIG. 3, the wire electrode can be fed so that most of the metal is deposited in the lower corner against the end wall of the right work piece 29. By reversing the angle, as shown in dotted lines in FIG. 3, the next pass can be deposited against the other wide wall, i.e., of piece 31. By thus making alternate passes, the space between the pieces 29, 31, is filled to a level suitable for receiving one or more final zigzag or sinusoidal passes, including a cap pass, if desired.

In normal welding operations, a pair of guide track members such as 27 and 33, FIG. 3, will be used. A separate welding head is mounted on each track. Plural units may be used on large pipes when rapid joint completion is important. These units may be sequenced for maximum efficiency so that one directs its wire electrode material to the right, the next to the left, etc. The carriage units which carry the welder units are quickly detachable from the tracks. They can be replaced quickly by other carriages mounting different kinds of welders, for example, of the oscillating type shown in FIG. 1.

It will be noted that in the embodiment just described, there is no cam or cam drive motor. These are omitted when a simple straight pass is preferred to a sinusoidal pass. It will be obvious, also, that other suitable cam mechanism can be used to obtain the oscillation of the head for sinusoidal passes. Thus, a cam, now shown, can be driven directly from the wire drive motor 280, FIG. 6, which motor and associated gearing are otherwise essentially the same as motor 80, etc., as described in connection with FIG. 1 above. With such an arrangement, a rotating cam driven from motor 80, having appropriate configuration for the desired oscillation, and located above the pivot shaft 55, FIG. 1, obviously can be used to engage a suitable cam follower analogous to 136, 137 to rock the head mount, analogous to plate 140 and associated parts, including the bracket 57 and the welding head 61 of FIGS. 1 and 2, in the manner already described.

By a choice of combinations of elements taken from the two modifications already described, a weld of almost any desired composition and pattern can be formed in an appropriate combination of welding passes. Welds thus may be formed in appropriate stepped sequence between the adjacent ends of two pieces of thick-walled pipe, or between any other edge or adjoining elements of work pieces that are to be secured together along a predetermined joint line.

Obviously, instead of mounting the guide track in the form of a band around a pipe or around any annular object, the track may be stretched or secured in any appropriate manner along a flat surface. A traveling carriage such as either of those described may be used in appropriate steps or passes to fill a joint between the edges of two adjoining plates. Such edges may be straight or curved, as long as the guide track is parallel to them. In welding pipe lines the initial first pass preferably is made inside the pipe. This procedure has the great advantage that it prevents burning through and spattering inside of the pipe when outside weld passes are made. Obviously, the first pass made from the outside should fuse into and securely attach to the inner pass weld, so as to avoid any flaws in the joint.

Instead of a single cam member of the double faced type, a plurality of single faced cams, or of double faced, etc., may be used. Obviously, barrel type cam mechanism or radial cams, operating on a suitable axis to impart oscillation in the proper plane to the welder head, can be substituted for the means described above.

The welding mechanism described in connection with the present invention can be used with or without an internal welding mechanism. The internal pass, in some cases, can be made manually. In some cases it may not be necessary to make an internal pass weld at all. Experience to date indicates, however, that a most desirable combination of welding steps is to use a mechanical automatic welder means for making the internal pass first and then to complete the weld from the outside by making as many external passes as necessary, distributing them as to type, with appropriate angular disposition of the welder heads, or oscillation of such heads, or both.

The wire electrode supply and feeding mechanism is fixed with respect to the welder frame, the flexible conduit allowing for variations in angle or oscillation of the head without interfering with continuing and reliable feed of electrode material to the welding arc.

The welding units of either the oscillating or non-oscillating but angularly variable types, described above, are small and light in weight. They are readily attachable to efficient self-driving and self-guiding carriage mechanism which is depicted best in FIG. 3 but which forms no part of the present invention. Obviously, one or more external weld mechanisms can be used, if desired, merely to complete a weld that is done partially by hand from the inside or from the outside. The units of this invention therefore have broad application to many types of welding operations, including not only various types of girth joints between the ends of pipes and similar annular members, but also for welding contiguous edges or ends of plates, bars, beams, angles, and other metal shapes.

While mechanical travel means are preferred for carrying the welder head along the predetermined welding line between two contiguous work pieces which are to be fastened together, the welder unit may, in some cases, be pushed manually along such a path. Alternatively, the welder unit may be held in a fixed spatial position and the work rotated or translated with respect to the welding head as the welding pass is performed. Thus, a pair of rotatable pipes, equipped with one or more guide tracks, may be rotated beneath a welder unit which is held, for example, directly above the joint, appropriate guide track or equivalent positioning means being used to maintain proper alignment between the welder unit and the line and plane of the joint. Such an arrangement may be used, for example, in so-called "double jointing". Preferably, however, the work is held fixed and the welder is traveled mechanically along and in proper alignment with the joint being formed.

Figure 9:
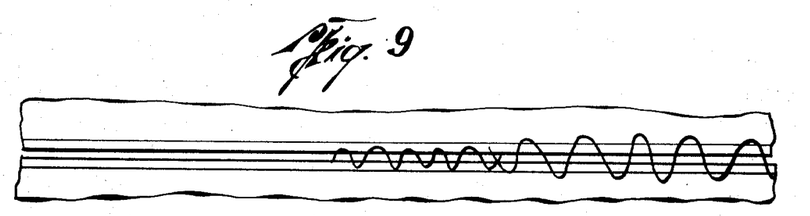
FIG. 9 is a graphical illustration of typical travel paths for the apparatus of both modifications mentioned above.

FIG. 7 shows the welder head 267 inclined considerably to the right to deposit molten metal from the electrode W against the side of the groove. In dotted lines it shows the head inclined in the other direction. FIG. 8 shows fragmentarily a track element 27, supported by pins 28 which engage the pipe or other work piece 29. The carriage 21, shown fragmentarily, is guided by rolls 23, etc., engaging the track edges. FIG. 9 shows an angularly directed weld pass at A, an opposite pass at B, a narrow sinusoidal pass at C and a broader sinusoidal pass at D, all fed into the kerf K between work pieces $P_1$ and $P_2$. Other passes at other angles and arrangements can be produced by the apparatus of this invention.

The apparatus described above is particularly suitable for completing welds in pipe joints when the gap to be filled is relatively deep in proportion to its width. For example, pipe ends may be shaped so that when in position for welding they are actually or very nearly in contact around their inner peripheries or at a narrow annular area at or near the inner periphery, but spaced somewhat more at or outside the middle of the pipe thickness. In a typical joint, there may be a very small V-joint at the inner surface, a narrow land just outside this V-joint where the adjoining pipe ends are actually or nearly in abutment, a vertical or nearly vertical rabbet outside this land, stepping back a small fraction of an inch, say one-thirty-second to one-eighth inch in one or both pipe ends with wall perpendicular to the pipe axis, and a wide V-joint on the outside.

Such a joint as just described may be welded by a first inner pass which may do little more than tack the pipe ends together, but which preferably is a sound single pass inner bead, penetrating one-sixth to one-third through the pipe wall thickness. This is the first pass weld. The next pass is a rapid hot pass, wherein substantial quantities of heat are applied and a weld pass of substantial thickness is made. This pass fuses into the inner pass to make a good bond. Also, because of the quantity of heat applied, it fuses well back into body of the pipe, particularly at the mid-point of pipe wall thickness. This makes a strong weld but because of the quantity of heat, austenitic conditions are often created and the welded metal is subject to corrosion unless protected. Such protection may be given by making one or more slower, lighter welding passes outside the hot pass. Such a lighter pass is not nearly as susceptible to corrosion as the "hot" pass.

Thus, by using one or more hot penetrating passes for a substantial part of the joint thickness inside both walls of the pipe, fusing into the inner first pass, and thereafter covering with one or more protective outer passes, a strong weld may be produced which was excellent corrosion resistance.

The hot pass mentioned above may be produced in one or more steps, including a pass using direct vertical electrode feed into the relatively narrow gap, or a plurality of such vertical passes, or one or more angle or slanted passes, using the tilted head. A combination of such vertical and slanted passes may be used, depositing electrode metal rapidly and at high temperature, i.e., using heavy welding current. Thereafter, the cover passes may be made at lower temperature, taking more time and depositing the molten electrode material in a thinner layer or plurality of thin layers.

Thus, a method or process aspect of the invention involves a plurality of welding passes made in such combination and sequence as to provide an inner bead first, to hold the work pieces together, a deep penetrating middle pass with sufficient heat soak to provide a strong weld in the middle of the wall thickness, or a plurality of such passes, and one or more cover passes made under milder conditions to minimize austenitic formation and provide better resistance against corrosion.

Typically, the inner pass penetrates one-third or less of the wall thickness but makes a smoother inner surface with the parts well bonded together. This pass is strong enough to hold the ends of large diameter pipe, of wall thickness of three-eighth inch up to one-half inch or more, so that the clamping mechanism can be removed. From the outside, one or more hot middle passes are made, sufficient heat being applied to fuse well back into the pipe metal. Finally, one or more outer passes, including a capping pass are made, using an oscillating pattern. Depending on the width of the gap being filled, one or more narrow band oscillating passes are made, followed, where needed, with one or more capping passes.

While reference has been made to welding pipes, it will be understood that flat plates and other shapes can be welded together in analogous fashion. Also, instead of using the electric arc, other systems such as electron beam or plasma jet may be used, at least for one or more of the welding passes. While automatic means are preferred for all passes, some of them, the inside stringer bead, for example, or a capping bead, may be applied manually. Thus, the combinations of steps may be varied to carry out the essence of the process which provides strong sound welds with unusually good resistance to corrosion from inside or outside, especially the latter.

Instead of oscillating the welding head across the weld being formed, it may be desirable to reciprocate the welding head back and forth along the direction in which the weld is being formed. Such back and forth reciprocation can be beneficial in effecting some turbulence in the weld material to accomplish a degassing action which would reduce porosity in the weld; additionally, such reciprocation will result in giving the weld a preferred grain structure.

Figure 10:
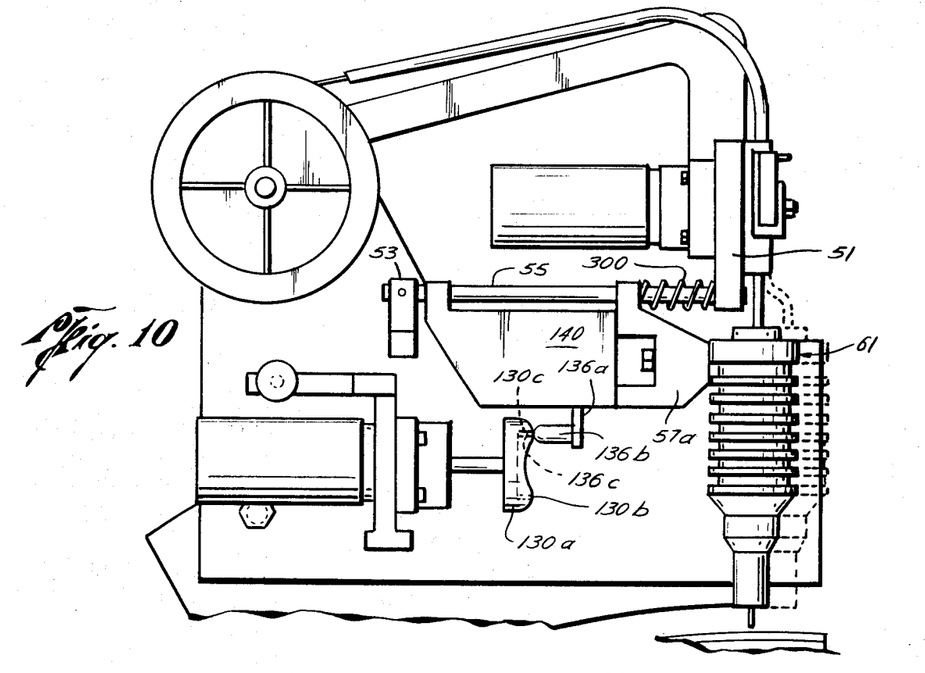
FIG. 10 is a view similar to FIG. 1 and illustrating a modified form of cam for reciprocating or oscillating the welding head in a direction in alignment with the direction of the weld.

In FIG. 10, a structure for carrying out reciprocation along the joint as well as transversely is illustrated. The plate 140 which is pivoted upon the shaft 55 is attached to a modified bracket 57a which carries the welding head 61. The upper portion of the bracket 57a is reduced in size so that a spring 300 may be interposed between the bracket and the support 51; such arrangement allows plate 140, bracket 57a and welding head 61 to reciprocate in a direction along the direction in which the weld is being formed.

To achieve the reciprocating motion, a cam 130a is substituted for the cam 130 of the form shown in FIG. 1. The face 130b of this cam is formed with desired lobes upon which rides a projection 136b carried by a depending arm 136a, the latter being attached to the plate 140. A circular groove 130c may be formed in the face of the cam to receive a pin 136c. It will be evident that the spring 300 urges the projection 136b into contact with the face of the came 130a and as the cam rotates, the welding head will be reciprocated. The amount of reciprocation will, of course, be controlled by the contour of the cam lobes 130b.

In other instances it may be desirable to reciprocate the welding head along the direction in which the weld is being formed and at the same time oscillate the welding head laterally across the weld being formed. Such dual motion makes it possible to duplicate preferred manual techniques in applying welding or filler material in accomplishing a welding operation. This can be readily accomplished by providing a groove 130d (FIG. 11) of the desired shape in place of the circular groove 130c; the groove 130d of course, receives the pin 136c of projection 136b and has a shape to give the desired oscillation. With this double motion, that is, reciprocation along the direction of the weld and oscillation across the weld being formed, the welding head can be controlled to travel any desired path. As an example, travel paths, such as shown in FIG. 12, may be traversed by the welding head.

Figures 11, 13:
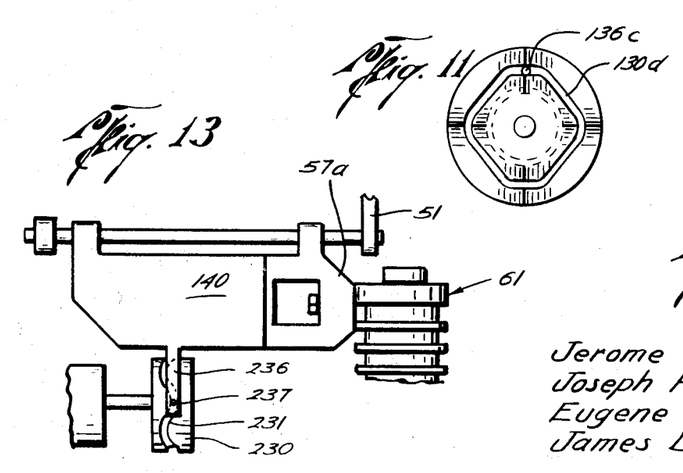
FIG. 11 is a face view of a modification of the cam shown in FIG. 10 which would result in the welding head being reciprocated in the weld direction and also being oscillated across the path of the weld.
FIG. 13 is a partial view of the means which supports the welding head and illustrating another type of cam means which would reciprocate the welding head in a direction along the direction of the weld.
Figure 12:
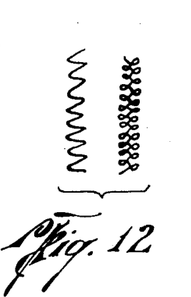
FIG. 12 illustrates the path of travel of the welding wire as effected by the cam shown in FIG. 11.

In FIG. 13 there is illustrated another means of reciprocating the welding head along the direction of that in which the weld is being formed. In this case a cam 230 has a cam groove 231 in its periphery. A depending arm 236 is attached to the plate 140 and has a pin 237 engaged within the groove. With this construction the plate 140 and the bracket 57a which support the welding head 61 are positively reciprocated and there is no need to employ the spring 300.

If it is desired to give the welding head unit the transverse oscillating motion, as well as the reciprocating motion, the periphery of the cam 230 may also be formed with cam lobes so that the arm 236 will be swung transversely at the same time that it is reciprocated.

It will be obvious to those skilled in the art that various modifications in addition to those mentioned above may be made without departing from the spirit and purpose of this invention.

We claim:

1. Apparatus for performing a welding operation to join together the contiguous ends of two axially aligned hollow cylindrical work elements, such as large pipes and the like, in a girth weld lying substantially in a plane more or less perpendicular to the axes of said work elements, comprising, in combination:
    a. an endless guide track firmly secured to and surrounding one of said work elements near and parallel to the weld plane,
    b. a self-driven carriage mountable and demountable on said track, adapted to frictionally engage the parallel side edges of said track in driving relationship and to move around said track in a path parallel to and radially outside the weld,
    c. a mounting sub-frame secured to said carriage in a position generally parallel to the weld plane, said sub-frame supporting a supply of consumable electrode wire, a wire feeding means, and a separate support for a welding head, said welding head support being movably attached to said sub-frame in an orientation generally parallel with said sub-frame and weld plane and being adapted to hold said head generally in the weld plane,
    d. a welding head secured to said support,
    e. means operable between said sub-frame and said welding head support, comprising both an alignment adjusting mechanism and a selectively operable power driven cyclical reciprocating means for causing the welding head to follow a sinusoidal path which repeatedly traverses the welding plane, and
    f. flexible guide means for directing the wire from the wire feeding means into said welding head regardless of the position of the welding head with respect to the weld plane.

2. Apparatus according to claim 1 wherein the shifting means comprises an adjusting screw for varying the distance between the sub-frame and the welding head support.

3. Apparatus according to claim 1 in which the cyclical means includes a rotatable cam and cam follower.

4. Apparatus according to claim 1 which comprises a pivot shaft supported by said sub-frame, a plurality of rocker arms supported on said pivot shaft, multiple track cam means having a plurality of dissimilar cam surfaces, and a separate independently engageable cam follower on a rocker arm for each of said cam surfaces, for controlling the position and movement of the welding head selectively with respect to the sub-frame.

5. Apparatus according to claim 4 which includes manually operable selector means for selectively engaging and disengaging the cam followers from the cam surfaces.

6. Apparatus according to claim 1 which includes means for reciprocating the welder head backward and forward along the line of the weld.

7. Apparatus according to claim 1 which includes means for reciprocating the welding head along the line of the weld and means for reciprocating the welding head transversely of the weld.

8. Apparatus according to claim 1 in which the welding head is supported on a side plate pivoted to the sub-frame with the pivot axis parallel to the weld plane, which includes an adjusting screw for moving the side plate about its axis.

9. Apparatus according to claim 8 which includes power driven reciprocating means for shifting the welding head back and forth across the weld plane as the head travels, and shiftable means for selectively engaging and disengaging said head with respect to said power driven means.

10. Apparatus according to claim 1 wherein the cyclical reciprocating means comprises a driven rotary cam fixedly mounted with respect to the sub-frame and shiftable means for selectively engaging and disengaging said cam.

* * * * *